US008019834B2

(12) United States Patent
Horvitz et al.

(10) Patent No.: US 8,019,834 B2
(45) Date of Patent: Sep. 13, 2011

(54) HARNESSING INFORMATION ABOUT THE TIMING OF A USER'S CLIENT-SERVER INTERACTIONS TO ENHANCE MESSAGING AND COLLABORATION SERVICES

(75) Inventors: Eric J. Horvitz, Kirkland, WA (US); Johnson T. Apacible, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 146 days.

(21) Appl. No.: 12/476,195

(22) Filed: Jun. 1, 2009

(65) Prior Publication Data
US 2009/0299934 A1 Dec. 3, 2009

Related U.S. Application Data

(63) Continuation of application No. 10/464,184, filed on Jun. 18, 2003, now Pat. No. 7,634,528, which is a continuation-in-part of application No. 10/220,419, filed on Aug. 30, 2002, now Pat. No. 7,243,130, and a continuation-in-part of application No. 10/220,550, filed as application No. PCT/US01/08710 on Mar. 16, 2001.

(60) Provisional application No. 60/189,801, filed on Mar. 16, 2000.

(51) Int. Cl.
*G06F 15/16* (2006.01)
(52) U.S. Cl. ........ 709/217; 709/206; 709/223; 709/224; 709/225; 709/207; 702/150; 706/49
(58) Field of Classification Search .................. 709/207, 709/206, 232, 223, 224, 245, 219, 238, 240, 709/225
See application file for complete search history.

(56) References Cited

U.S. PATENT DOCUMENTS

| 4,789,962 A | 12/1988 | Berry et al. |
| 5,377,354 A | 12/1994 | Scannell et al. |
| 5,423,043 A | 6/1995 | Fitzpatrick et al. |

(Continued)

FOREIGN PATENT DOCUMENTS

EP 0 095 633 A1 12/1983

(Continued)

OTHER PUBLICATIONS

[No Author Listed] Workshop on Wearable Computing Systems, Aug. 19-21, 1996.

(Continued)

*Primary Examiner* — Jude J Jean Gilles
(74) *Attorney, Agent, or Firm* — Wolf, Greenfield & Sacks, P.C.

(57) ABSTRACT

A system and method is provided to facilitate communication and collaboration by considering the timing of a user's activities on one or more clients via accessing, from a centralized server, information about the user's client-server interactions. The systems and methods can harness existing protocols and data exchange used in legacy client-server applications for email, making available to one or more client-side message routing applications, information about a user's interactions with email across multiple clients. Applications include considering the time since the last client-server interaction to guide decisions about if, when, and how to route messages so as to limit the mobile relay of information a user has already seen, providing information to colleagues about a user's current or past "inbox presence," and forecasting the time until a user will have access to a device or communication channel.

20 Claims, 10 Drawing Sheets

U.S. PATENT DOCUMENTS

| | | | |
|---|---|---|---|
| 5,471,399 A | 11/1995 | Tanaka et al. |
| 5,493,692 A | 2/1996 | Theimer et al. |
| 5,508,817 A | 4/1996 | Kunigami |
| 5,544,321 A | 8/1996 | Theimer et al. |
| 5,555,346 A | 9/1996 | Gross et al. |
| 5,555,376 A | 9/1996 | Theimer et al. |
| 5,603,054 A | 2/1997 | Theimer et al. |
| 5,611,050 A | 3/1997 | Theimer et al. |
| 5,615,325 A | 3/1997 | Peden |
| 5,617,526 A | 4/1997 | Oran et al. |
| 5,644,363 A | 7/1997 | Mead |
| 5,717,877 A | 2/1998 | Orton et al. |
| 5,736,974 A | 4/1998 | Selker |
| 5,742,905 A | 4/1998 | Pepe et al. |
| 5,751,965 A | 5/1998 | Mayo et al. |
| 5,757,852 A | 5/1998 | Jericevic et al. |
| 5,757,916 A | 5/1998 | MacDoran et al. |
| 5,767,852 A | 6/1998 | Keller et al. |
| 5,784,124 A | 7/1998 | D'Alitalia et al. |
| 5,812,865 A | 9/1998 | Theimer et al. |
| 5,831,545 A | 11/1998 | Murray et al. |
| 5,852,440 A | 12/1998 | Grossman et al. |
| 5,859,640 A | 1/1999 | de Judicibus |
| 5,864,848 A | 1/1999 | Horvitz et al. |
| 5,928,330 A | 7/1999 | Goetz et al. |
| 5,973,612 A | 10/1999 | Deo et al. |
| 5,987,234 A | 11/1999 | Hirosawa et al. |
| 6,021,403 A | 2/2000 | Horvitz et al. |
| 6,055,505 A | 4/2000 | Elston |
| 6,057,842 A | 5/2000 | Knowlton et al. |
| 6,067,477 A | 5/2000 | Wewalaarachchi et al. |
| 6,067,565 A | 5/2000 | Horvitz |
| 6,078,322 A | 6/2000 | Simonoff et al. |
| 6,078,568 A | 6/2000 | Wright et al. |
| 6,092,068 A | 7/2000 | Dinkelacker |
| 6,094,681 A | 7/2000 | Shaffer et al. |
| 6,101,531 A | 8/2000 | Eggleston et al. |
| 6,119,014 A | 9/2000 | Alperovich et al. |
| 6,144,363 A | 11/2000 | Alloul et al. |
| 6,167,448 A | 12/2000 | Hemphill et al. |
| 6,199,106 B1 | 3/2001 | Shaw et al. |
| 6,256,664 B1 | 7/2001 | Donoho et al. |
| 6,262,730 B1 | 7/2001 | Horvitz et al. |
| 6,289,380 B1 | 9/2001 | Battat et al. |
| 6,301,609 B1 | 10/2001 | Aravamudan et al. |
| 6,327,581 B1 | 12/2001 | Platt |
| 6,332,127 B1 | 12/2001 | Bandera et al. |
| 6,337,699 B1 | 1/2002 | Nielsen |
| 6,342,908 B1 | 1/2002 | Bates et al. |
| 6,353,398 B1 | 3/2002 | Amin et al. |
| 6,360,101 B1 | 3/2002 | Irvin |
| 6,374,289 B2 | 4/2002 | Delaney et al. |
| 6,400,810 B1 | 6/2002 | Skladman et al. |
| 6,425,127 B1 | 7/2002 | Bates et al. |
| 6,437,812 B1 | 8/2002 | Giles et al. |
| 6,438,618 B1 | 8/2002 | Lortz et al. |
| 6,456,307 B1 | 9/2002 | Bates et al. |
| 6,459,440 B1 | 10/2002 | Monnes et al. |
| 6,459,913 B2 | 10/2002 | Cloutier |
| 6,463,462 B1 | 10/2002 | Smith et al. |
| 6,463,471 B1 | 10/2002 | Dreke et al. |
| 6,466,232 B1 | 10/2002 | Newell et al. |
| 6,480,207 B1 | 11/2002 | Bates et al. |
| 6,499,021 B1 | 12/2002 | Abu-Hakima |
| 6,513,026 B1 | 1/2003 | Horvitz et al. |
| 6,513,046 B1 | 1/2003 | Abbott, III et al. |
| 6,542,868 B1 | 4/2003 | Badt et al. |
| 6,549,219 B2 | 4/2003 | Selker |
| 6,549,915 B2 | 4/2003 | Abbott, III et al. |
| 6,563,514 B1 | 5/2003 | Samar |
| 6,577,329 B1 | 6/2003 | Flickner et al. |
| 6,584,502 B1 | 6/2003 | Natarajan et al. |
| 6,590,587 B1 | 7/2003 | Wichelman et al. |
| 6,591,279 B1 | 7/2003 | Emens et al. |
| 6,593,943 B1 | 7/2003 | MacPhail |
| 6,618,716 B1 | 9/2003 | Horvitz |
| 6,622,160 B1 | 9/2003 | Horvitz |
| 6,650,902 B1 | 11/2003 | Richton |
| 6,672,506 B2 | 1/2004 | Swartz et al. |
| 6,674,720 B1 | 1/2004 | Passint et al. |
| 6,678,719 B1 | 1/2004 | Stimmel |
| 6,697,840 B1 | 2/2004 | Godefroid et al. |
| 6,714,967 B1 | 3/2004 | Horvitz |
| 6,741,188 B1 | 5/2004 | Miller et al. |
| 6,747,675 B1 | 6/2004 | Abbott et al. |
| 6,757,362 B1 | 6/2004 | Cooper et al. |
| D494,584 S | 8/2004 | Schlieffers et al. |
| 6,781,972 B1 | 8/2004 | Anderlind et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,829,639 B1 | 12/2004 | Lawson et al. |
| 6,837,436 B2 | 1/2005 | Swartz et al. |
| 6,842,877 B2 | 1/2005 | Robarts et al. |
| 6,853,634 B1 | 2/2005 | Davies et al. |
| 6,965,917 B1 | 11/2005 | Aloni et al. |
| 7,010,501 B1 | 3/2006 | Roslak et al. |
| 7,016,944 B1 | 3/2006 | Meyer et al. |
| 7,040,541 B2 | 5/2006 | Swartz et al. |
| 7,063,263 B2 | 6/2006 | Swartz et al. |
| 7,069,309 B1 | 6/2006 | Dodrill et al. |
| 7,073,129 B1 | 7/2006 | Robarts et al. |
| 7,139,718 B2 | 11/2006 | Jeyachandran et al. |
| 7,155,729 B1 | 12/2006 | Andrew et al. |
| 7,162,238 B1 | 1/2007 | Massie et al. |
| 7,171,378 B2 | 1/2007 | Petrovich et al. |
| 7,195,157 B2 | 3/2007 | Swartz et al. |
| 7,209,955 B1 | 4/2007 | Major et al. |
| 7,243,130 B2 | 7/2007 | Horvitz et al. |
| 7,259,694 B2 | 8/2007 | Myllymaki et al. |
| 7,385,501 B2 | 6/2008 | Miller |
| 7,634,528 B2 * | 12/2009 | Horvitz et al. ............... 709/200 |
| 7,743,340 B2 | 6/2010 | Horvitz et al. |
| 7,844,666 B2 | 11/2010 | Horvitz et al. |
| 2001/0007992 A1 | 7/2001 | Nakaoka |
| 2001/0030664 A1 | 10/2001 | Shulman et al. |
| 2001/0030667 A1 | 10/2001 | Kelts |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2001/0049275 A1 | 12/2001 | Pierry et al. |
| 2002/0032689 A1 | 3/2002 | Abbott et al. |
| 2002/0044152 A1 | 4/2002 | Abbott et al. |
| 2002/0052930 A1 | 5/2002 | Abbott et al. |
| 2002/0052963 A1 | 5/2002 | Abbott et al. |
| 2002/0054117 A1 | 5/2002 | van Dantzich et al. |
| 2002/0054130 A1 | 5/2002 | Abbott et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0085701 A1 * | 7/2002 | Parsons et al. ............ 379/211.01 |
| 2002/0087525 A1 | 7/2002 | Abbott et al. |
| 2002/0087649 A1 | 7/2002 | Horvitz |
| 2002/0099817 A1 | 7/2002 | Abbott et al. |
| 2002/0171581 A1 | 11/2002 | Sheynblat et al. |
| 2002/0174199 A1 | 11/2002 | Horvitz |
| 2003/0028603 A1 | 2/2003 | Aktas et al. |
| 2003/0046351 A1 | 3/2003 | Maruyama et al. |
| 2003/0046401 A1 | 3/2003 | Abbott et al. |
| 2003/0046421 A1 | 3/2003 | Horvitz et al. |
| 2003/0154476 A1 | 8/2003 | Abbott et al. |
| 2003/0182394 A1 * | 9/2003 | Ryngler et al. ............... 709/217 |
| 2004/0030753 A1 | 2/2004 | Horvitz |
| 2004/0061716 A1 | 4/2004 | Cheung et al. |
| 2004/0098462 A1 | 5/2004 | Horvitz et al. |
| 2004/0117443 A1 | 6/2004 | Barsness |
| 2004/0143636 A1 | 7/2004 | Horvitz et al. |
| 2004/0199663 A1 | 10/2004 | Horvitz et al. |
| 2004/0201500 A1 | 10/2004 | Miller et al. |
| 2004/0225718 A1 | 11/2004 | Heinzel et al. |
| 2005/0034078 A1 | 2/2005 | Abbott et al. |
| 2005/0050143 A1 | 3/2005 | Gusler et al. |

| | | | |
|---|---|---|---|
| 2005/0248437 | A1 | 11/2005 | Hellebust et al. |
| 2005/0266858 | A1 | 12/2005 | Miller et al. |
| 2005/0272442 | A1 | 12/2005 | Miller et al. |
| 2006/0019676 | A1 | 1/2006 | Miller et al. |
| 2007/0011314 | A1 | 1/2007 | Horvitz et al. |
| 2007/0214228 | A1 | 9/2007 | Horvitz et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |

FOREIGN PATENT DOCUMENTS

| | | | |
|---|---|---|---|
| EP | 0 375 138 | A2 | 6/1990 |
| EP | 0 413 537 | A2 | 2/1991 |
| EP | 0 420 779 | A2 | 4/1991 |
| EP | 0 867 823 | A2 | 9/1998 |
| EP | 0 905 633 | A2 | 3/1999 |
| EP | 1 022 670 | A2 | 7/2000 |
| GB | 2328110 | A | 2/1999 |
| GB | 2353679 | A | 2/2001 |
| JP | 06-168086 | A | 6/1994 |
| JP | 06168281 | A | 6/1994 |
| JP | 06230918 | A | 8/1994 |
| JP | 07-143164 | A | 6/1995 |
| JP | 08314827 | A | 11/1996 |
| JP | 09-101990 | A | 4/1997 |
| JP | 09-212505 | A | 8/1997 |
| JP | 10-003375 | A | 1/1998 |
| JP | 10-013461 | A | 1/1998 |
| JP | 10079756 | A | 3/1998 |
| JP | 11146010 | A | 5/1999 |
| JP | 11316726 | A | 11/1999 |
| JP | 2001237874 | A | 8/2001 |
| JP | 2001331422 | A | 11/2001 |
| WO | WO-96/35994 | A1 | 11/1996 |
| WO | WO-97/38382 | A1 | 10/1997 |
| WO | WO-98/00787 | A1 | 1/1998 |
| WO | WO-98/37680 | A2 | 8/1998 |
| WO | WO-98/47268 | A1 | 10/1998 |
| WO | WO-98/58321 | A1 | 12/1998 |
| WO | WO-99/06915 | A1 | 2/1999 |
| WO | WO-99/34628 | A1 | 7/1999 |
| WO | WO-99/41720 | A1 | 8/1999 |
| WO | WO-99/67731 | A1 | 12/1999 |
| WO | WO-00/36493 | A1 | 6/2000 |
| WO | WO-00/51040 | A1 | 8/2000 |
| WO | WO-01/01264 | A1 | 1/2001 |
| WO | WO-01/04723 | A2 | 1/2001 |
| WO | WO-01/09753 | A2 | 2/2001 |
| WO | WO-01/09755 | A2 | 2/2001 |
| WO | WO-01/58119 | A2 | 8/2001 |
| WO | WO-01/69387 | A2 | 9/2001 |
| WO | WO-01/69432 | A2 | 9/2001 |
| WO | WO-01/69532 | A1 | 9/2001 |
| WO | WO-02/39761 | A2 | 5/2002 |
| WO | WO-02/065250 | A2 | 8/2002 |
| WO | WO-03/048914 | A2 | 6/2003 |
| WO | WO-2004/025912 | A2 | 3/2004 |

OTHER PUBLICATIONS

Baclace, "Competitive Agents for Information Filtering", Dec. 1999, 1 pg.
Billinghurst et al., "An Evaluation of Wearable Information Spaces" Proceedings of the Virtual Reality Annual International Symposium, 1998, 8 pgs.
Billinghurst et al., "Wearable Devices: New Ways to Manage Information", IEEE Computer Society, Jan. 1999, pp. 57-64.
Billinghurst, "Research Directions in Wearable Computing" University of Washington, May 1998, 48 pgs.
Boone, Concept Features in Re: Agent, an Intellectual Email Agent, 1998, 8 pgs.
Breese et al., "Empirical analysis of predictive algorithms for collaborative filtering", Proceedings of the 14th Conference on Uncertainty in AI, 1998 p. 43-52, AUAI, Morgan Kaufmann, San Francisco.
Cameron et al. "Identifying and Localizing Electrical Components: A Case Study of Adaptive Goal-directed Sensing", 1997, 6 pgs.
Chang et al., "Bayesian Analysis for Fault Location in Homogeneous Distributed Systems", 1993, 10 pgs.
Chen et al., "A Survey of Context-Aware Mobile Computing Research", Dartmouth Computer Science Technical Report, 2000, 16 pgs.
Chen, "Visualising semantic spaces and author co-citation networks in digital libraries", 1999, 20 pgs.
Chu et al., "A Decision-Theoretic Approach to Reliable Message Delivery", 15 pgs.
Cohen, "Learning Rules that Classify E-Mail", 1996, 11 pgs.
Czerwinski et al., "Visualizing implicit queries for information management and retrieval", Proceedings of CHI'99, ACM SIGCHI Conf on Informational and Knowledge Management, 1999, p. 560-567.
Dumais et al., "Inductive learning algorithms and representations for text categorization", Proceedings of 7th Intl Conf on Information and Knowledge Management, 1998, pp. 148-155.
EP Search Report dated Jun. 20, 2005 for EP 02025530.
EP Search Report dated Jul. 5, 2004 for EP Application No. 04 00 0621.
EP Search Report dated Sep. 28, 2005 for EP Application No. 05 10 5299.
Haddawy, "An Overview of Some Recent Developments in Bayesian Problem-Solving Techniques Introduction to This Special Issue", 1999, 9 pgs.
Harter et al., "A Distributed Location System for Active Office", IEEE Network, 1994, pp. 62-70.
Hearst et al., "Machine Learning in Information Access Papers from the 1996 AAAI Spring Symposium", 1996, 3 pgs.
Helfman et al., "Ishmail: Immediate Identification of Important Information", 8 pgs.
Horvitz et al., "Attention-Sensitive Alerting in Computing Systems", Microsoft Research, Aug. 1999.
Horvitz et al., "Display of Information for time-critical decision making" Proceedings of the 11th Conference on uncertainty in AI, 1995, p. 296-305, Montreal, Canada.
Horvitz et al., "In Pursuit of Effective Handsfree Decision Support: Coupling Bayesian Inference" Speech Understanding, and User Models, 1995, 8 pgs.
Horvitz et al., "Models of Attention in Computing and Communication: From principles to Applications", Communications to the ACM 46(3):56-29, Mar. 2003.
Horvitz et al., "The Lumiere project: Bayesian user modeling for inferring the goals and needs of software users", Proceedings of the 14th conference on uncertainty in AI, 1998, p. 256-265, Morgan Kaufmann, San Francisco.
Horvitz, "Principles of mixed-initiative user interfaces" Proceedings of CHI'99, ACH SIGCHI Conf on Human Factors in Computing Systems, 1999, pp. 159-166, Pittsburgh, PA.
Horvitz, "Time dependant utility and action under uncertainty", Proceedings of the 7th Conference on Uncertainty in AI, LA, CA, 1991 pp. 151-158, Morgan Kaufmann, San Francisco.
Horvitz, "Time-critical action: Representations and Application", Proceedings of the 13th Conference on Uncertainty in AI(UAI-97), 1997, pp. 250-257, Providence, RI, Morgan Kaufmann, San Francisco.
International Search Report dated Aug. 20, 2002 for International Application Serial No. PCT/US01/08711.
International Search Report dated Jun. 28, 2006 for International Application Serial No. PCT/US04/19915.
International Search Report dated Sep. 2, 2002 for International Application Serial No. PCT/US01/08710.
International Search Report dated Sep. 29, 2003 for International Application Serial No. PCT/US00/20685.
Iwayama et al., "Hierarchical Bayesian Clustering for Automatic Text Classification", 1995, 6 pgs.
Jensen, "Bayesian networks basics", Winter 1995/ Spring 1996, 14 pgs.
Joachims, "Text categorization with support vector machines: learning with many relevant features", Machine Learning, European Conference on Machine Learning, Apr. 21, 1998, pp. 137-142.
Kalakota et al., "Mobile Agents and Mobile Workers", Proceedings of the European Conference on Machine Learning, Apr. 21, 1998, pp. 137-142, Germany.

Koller et al., "Toward optimal feature selection", Proceedings of 13th conference on machine learning, 1998, p. 284-293, Morgan Kaufmann, San Francisco.

Kozierok et al., "A Learning Interface Agent for Scheduled Meetings", Feb. 2003, pp. 81-93.

Lashkari et al., "Collaborative Interface Agents", Proceedings AAAI, National Conference on Artificial Intelligence, Jul. 21, 1994, vol. 1, pp. 444-449.

Lee et al., "Learning and Predicting User Behavior for Particular Resource Use", Proceedings of the Florida Artificial Intelligence Research Symposium, May 21, 2001, pp. 177-181.

Leiberman, "Letizia: An Agent that assists web browsing", Proceedings of IJCAI-95, 1995, 6 pgs, Montreal, Canada, Morgan Kaufmann, San Francisco.

Loke et al., "Location-Based Personal Agents: A Metaphor for Situated Computing", Parallel Processing, 2000 International Workshops, Aug. 21, 2000, pp. 17-19.

Losee Jr., "Minimizing information overload: the ranking of electronic messages", 1989, 11pgs.

Macskassy et al., "EmailValet: Learning Email Preferences for Wireless Platforms", Rutgers University, user Modeling 1999 Workshop—Machine Learning for User Modeling, Jun. 3, 1999, 4 pgs.

Marx et al., "Clues: Dynamic Personalized Message Filtering", Proceedings of the ACM 1996 Conference of Computer Supported Cooperative Work, Boston Nov. 16-20, 1996, p. 113-121.

McCrickard et al., "Attuning Notification Design to User Goals and Attention Costs" Communications of the ACM, vol. 46 Issue 3, pp. 67-72, 2003.

Noh et al, "Rational Communicative Behavior in Anti-Air Defense", 1998, 8 pgs.

Palme et al., "Issues when designing filters in messaging systems", 1996, 7 pgs.

Partial European Search Report dated Mar. 17, 2005 for EP Application No. 02025530, 3 pages.

Platt, "Fast Training of Support Vector Machines Using Sequential Minimal Optimization", Advances in Kernel Methods, Support Vector Learning, 1999 p. 41-65, MIT Press, Cambridge, MA.

Platt, "Probabilistic outputs for support vector machines and comparisons to regularized likelihood methods." Advances in Large Margin Classifiers. MIT Press, Cambridge, MA. 1999, 11 pages.

Rhodes, "Remembering Agent: A continuously running automated information retrieval system" The Proceedings of the First International Conference on The Practical Application of Intelligent Agents and Multi Agent Technology. 1996, pp. 487-495.

Rhodes, "The Wearable Remembrance Agent: A System for Augmented Memory", Personal Technologies Journal Special Issue on Wearable Computing. 1997, 12 pgs.

Rhodes, B., "The Wearable Remembrance Agent: A System for Augmented Memory," *Proceedings of the First International Symposium on Wearable Computers* (ISW '97), Cambridge, MA, Oct. 13-14, 1997.

Sahami et al., "A Bayesian approach to filtering junk email" Workshop on learning for text categorizations, 1998, 8 pgs, AAI technical Report WS-98-05, AAAI.

Sawhney et al., "Nomadic Radio: Speech and Audio Interaction for Contextual Messaging in Nomadic Environments", ACM Transactions on Computer-Human Interaction, ACM, Sep. 1, 2000, pp. 353-383.

Sawhney et al., "Speaking and Listening on the Run: Design for Wearable Audio Computing", 1998, 8 pgs.

Schilit et al., "Context-Aware Computing Applications" In Proceedings of the Workshop on Mobile Computing Systems and Applications, Dec. 1994, pp. 85-90.

Schilit et al., "Customizing Mobile Applications", Proceedings USENIX Symposium on Mobile and Location Independent Computing, Aug. 1993, 9 pgs.

Schilit et al., "Disseminating Active Map Information to Mobile Hosts" IEEE Network, 1994, p. 22-32, vol. 8—No. 5.

Schilit et al., "The ParcTab Mobile Computing System", IEEE WWOS-IV, 1993, 4 pgs.

Schilt, "A System Architecture for Context-Aware Mobile Computing", Columbia University, 1995, 153 pgs.

Seligmann et al., The Message is the Medium. Comp Net ISDN Sys. 1997;29:1519-30.

Shell et al., "Interacting with Groups of Computers", Communications of the ACM, vol. 46 Issue 3, pp. 40-46, 2003.

Spreitzer et al., "Architectural Considerations for Scalable, Secure, Mobile Computing with Location Information" In the 14th International Conference on Distributed Computing Systems, Jun. 1994, pp. 29-38.

Spreitzer et al., "Providing Location Information in Ubiquitous Computing Environment", SIGOPS '93, pp. 270-283.

Spreitzer et al., "Scalable, Secure, Mobile Computing with Location Information" Communications of the ACM, Jul. 1993, 1 pg. vol. 36—No. 7.

Starner, "Wearable Computing and Contextual Awareness" Massachusetts Institute of Technology, Jun. 1999, 248 pgs.

Susuki et al., Technique of Using Mobile & Network (3). Interop Magazine. Sep. 1, 1999; 9(7):170-73. Japanese.

Takkinen et al., "CAFÉ: A Conceptual Model for Managing Information in Electronic Mail", 1998, 10 pgs.

Theimer et al., "Operating System Issues for PDAs", In Fourth Workshop on Workstation Operating Systems, 193, 7 pgs.

Tsatsoulis et al., "integrating Case-Based Reasoning and Decision Theory", 1997, 10 pgs.

Van Dantzich et al., "Scope: Providing Awareness of Multiple Notifications at a Glance", Proceedings of AVI 2002, ACM Conference on Advanced Visual Interfaces, 2002, 11 pgs.

Vertegaal, "Designing Attentive Interfaces", Proceedings of the Symposium on ETRA 2002:Eye tracking research and applications symposium, pp. 23-30, 2002.

Want et al., "The Active Badge Location System, ACM Transactions on Information Systems" Jan. 1992, pp. 91-102, vol. 10—No. 1.

Want, "Active Badges and Personal Interactive Computing Objects" IEEE Transactions on Consumer Electronics, 1992, 11 pgs, vol. 38—No. 1.

Weiser, "The Computer of the 21st Century", Scientific American, Sep. 1991, 9 pgs.

Weiser, "Some Computer Science Issues in Ubiquitous Computing" Communications of the ACM, Jul. 1993, pp. 75-84, vol. 36—No. 7.

Tategami, Reading Mail Received on Peronsal Computer in i-mode, EveryMail Transfer. Associate Utilization Technique of i-mode + Personal Computer. 1st ed. A1 Publishing. Japan. Aug. 28, 2000:5-31. Japanese.

* cited by examiner

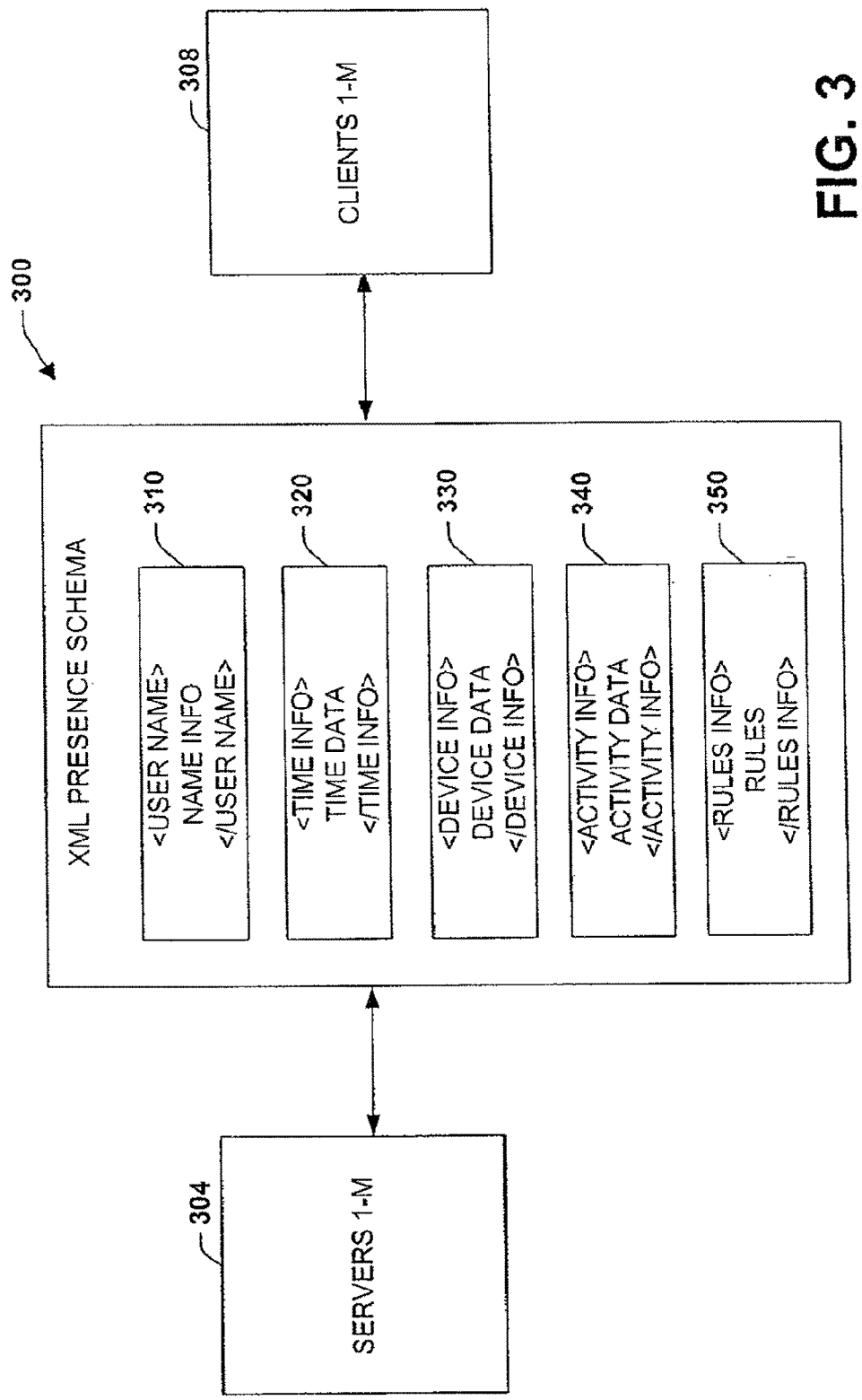

Options

Desktop | Beyond the Desktop | Filter & Move | Special Forward | Smart OOF | Archive Manager

Desktop Alerts

|  | Low | Medium | 90 | High |
|---|---|---|---|---|
|  | 0 — 70 |  |  | — 100 |

Low
- ☐ Sound
- ☐ Text Herald
- ☐ Priorities gets focus
- ☐ MS Agent

Medium
- ☐ Sound
- ☑ Text Herald
- ☐ Priorities gets focus
- ☐ MS Agent

High
- ☑ Sound
- ☑ Text Herald
- ☐ Priorities gets focus
- ☐ MS Agent

☑ Have heralds follow my attentional focus.
☑ If Priorities detects that you are busy, it will defer alerts unless message priority is at least: [90]  ← 410
☑ Defer alerts if conversation is detected.
☑ Defer by at most [10] minutes.
☐ Use context-sensitive thresholds and volume control preferences

[ OK ]  [ Cancel ]  [ Apply ]

Options

Desktop | Beyond the Desktop | Filter & Move | Special Forward | Smart OOF | Archive Manager

Mobile Device [Email]: [4255551212@mobile.att.net]

New Mail Notification

☑ Notify me about new mail when its priority is greater than [80] and when I have been away from my computer for [30] minutes. ☑ Use Priorities' prediction about my time away.

☑ Only between [7:00 AM] and [10:30 PM]

☑ Also consider my presence on other clients. ← 510

☑ Only notify me during a normal meeting if priority is over: [85] or [95] For specially marked mtgs.

Mobile Schedule Notification

☑ Send meeting reminders if I am away from my computer for [5] minutes after the desktop reminder is displayed. ☐ Send my daily schedule at [7:30 AM]

☑ Include next scheduled meeting

☑ Don't interrupt meetings

Availability Forecast Analysis and Sharing

☐ Automatically share Priorities' TimeWave analysis of my availability on my calendar.

[OK] [Cancel] [Apply]

HARNESSING INFORMATION ABOUT THE TIMING OF A USER'S CLIENT-SERVER INTERACTIONS TO ENHANCE MESSAGING AND COLLABORATION SERVICES

REFERENCE TO RELATED APPLICATIONS

This application Ser. No. 12/476,195, filed Jun. 1, 2009, is a continuation of U.S. patent application Ser. No. 10/464,184, filed Jun. 18, 2003 now U.S. Pat. No. 7,634,528, entitled HARNESSING INFORMATION ABOUT THE TIMING OF A USER'S CLIENT-SERVER INTERACTIONS TO ENHANCE MESSAGING AND COLLABORATION SERVICES which application Ser. No. 10/464,184 is a continuation in part of U.S. patent application Ser. No. 10/220,419, filed Aug. 30, 2002 (now U.S. Pat. No. 7,243,130 issued Jul. 10, 2007), which is a filing under 35 U.S.C. 371 of PCT Application Serial No. PCT/US01/08711, filed Mar. 16, 2001, which claims priority to U.S. Provisional Patent Application Serial No. 60/189,801, filed Mar. 16, 2000, U.S. patent application Ser. No. 09/596,365 filed Jun. 17, 2000 (now U.S. Pat. No. 7,249,159, issued Jul. 24, 2007), U.S. patent application Ser. No. 09/596,348 filed Jun. 17, 2000 (now U.S. Pat. No. 6,513,026, issued Jan. 28, 2003), U.S. patent application Ser. No. 09/596,364 filed Jun. 17, 2000 (now U.S. Pat. No. 6,601,012, issued Jul. 29, 2003), U.S. Provisional Patent Application Serial No. 60/212,296 filed Jun. 17, 2000, U.S. Provisional Patent Application Serial No. 60/212,293 filed Jun. 17, 2000, and U.S. patent application Ser. No. 09/595,401 filed Jun. 17, 2000 (now U.S. Pat. No. 7,417,650, issued Aug. 26, 2008); and which application Ser. No. 10/464,184 is a continuation in part of U.S. patent application Ser. No. 10/220,550, filed on Aug. 30, 2002, which is a filing under 35 U.S.C. 371 of PCT Application Serial No. PCT/US01/08710, filed on Mar. 16, 2001, which claims the benefit of U.S. Provisional Patent Application Serial No. 60/189,801, filed Mar. 16, 2000. All of the aforementioned patents and applications are incorporated herein by reference.

TECHNICAL FIELD

The present invention relates generally to systems and methods that facilitate communications between devices, systems, processes, and/or individuals. More particularly, the present invention relates to sharing user activity information between entities to provide information about a user's presence, absence, and/or availability for communications, to facilitate such tasks as routing of messages and coordinating collaboration.

BACKGROUND OF THE INVENTION

Some current client-side messaging systems and other derivatives run at a single location—i.e., related messaging software may execute on a single client machine. These systems may sense a user's presence (including the monitoring of keyboard and mouse activity, and/or monitoring of ambient acoustical activity via a microphone), at a local machine to make decisions about whether to consider executing mobile alerting by routing to a mobile device, some subset of messages that might be typically displayed to a user on a client application in situations where the user is present at the client device. If users are present at the local client, it is generally desired to suppress mobile messaging as such messages will be redundant with messages that have been or will soon be viewed by users. Simply stated, users generally do not want to be paged with messages when they are or will soon be receiving the messages at their client machines.

In earlier versions of these client-side systems, a deterministic or predicted time that a user has not been or will not be present at a client machine, respectively, is considered before mobile alerting is allowed. This limits mobile alerting to situations whereby a user will not see immediately, or will not soon see an email message so as to minimize the cost and annoyance of having email come to a paging device when the user will see it immediately or will soon see the messages at the client machine.

Providing the users with the ability to specify some finite amount of predicted away time, or time away that has already passed, before invoking mobile messaging allows a valuable buffer, that handles the case where a user is coming and going from the client machine, and still prefers to receive messages on the client machine, but that can also switch to mobile messaging if the delays either reach a threshold delay or are expected to reach a threshold. Timing can refer to the age of each message (the difference in time since it arrived or was sent and the current or predicted time that a user will be away), it can also be used to simply refer to the time that a user has not been present at the client machine. Threshold times before invoking mobile messaging can be fixed or made a function of the urgency of messages. Beyond the use of a delay for buffering to minimize the transmittal of messages via a mobile link or another alternate route to the user (e.g., another email address, telephone call with conversion of text to speech, etc.), in cases where a user will soon return to see a message, such a time delay bounds the total cost associated with the delayed relay of a message to a user. Putting specific limits on delays before a user sees messages depending on urgencies of messages bounds the losses associated with delays. Such bounded deferral policies allow for a characterization of maximal cost.

One problem with the client-side presence approach, and other client-side or local decision making about alerting via a transfer to a mobile device, is that a user can be falsely alerted when only client-side presence is considered. In one example, a user of this type messaging system typically executes a respective mobile routing application on a single machine. The user may then carry a mobile laptop to a meeting in a different building or may access email at a kiosk at a distant airport. When logged in at a distant site, email may be read via another communication with the user's email server (e.g., Microsoft Exchange server). Thus, a user's time away from their client device, which is locally executing a mobile routing program, may exceed some threshold time, leading to mobile alerting, when that user is actually intermittently reading email on another device, with delays that would be under the set threshold. Thus, even though users are receiving messages within the allowances of some predefined time, they are being alerted redundantly because there is no information available to the client-side message routing system about the user's presence at other machines; the messaging application at the user's office simply considers the user as being away.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and methodology for sharing user presence information between communications entities to facilitate effective routing and communication of messages. This type of shared information facilitates achieving awareness of a user's presence and communication status across multiple clients by accessing recent history of client-server activity (with any client) from the server—and using this information for enhanced services locally (on a client-side program) or globally (at the server). In one aspect, an activity component records or logs user activities while they are processing received messages such as email, for example. The logged activities can be recorded in a database and communicated between systems via the instantiation of predefined data schemas. The activity data can be shared between client applications, server applications, and/or other systems such as an automated prioritization system that automatically assigns an importance or urgency value to a message and/or a notification platform that considers various information sources and routes information to desired communications devices via various automated decision-making processes. When the information has been distributed, user controls can be provided to enable message systems to consider message activities at the client and/or other systems such as at the server application before routing messages to a respective mobile device (e.g., before routing this message to mobile device, consider user's presence or activities at other locations or machines).

The present invention can be employed with other systems such as mail servers (e.g., Microsoft Exchange servers) and client-side office software productivity applications (e.g., Microsoft Outlook) in addition to the previously noted systems by taking into consideration that a user may be accessing a service (e.g., e-mail) from multiple disparate computers. For example, if a prioritization system is running on a desktop computer and the user is away, the desktop computer/prioritization software may not be aware that the user is accessing the e-mail via another device (e.g., PDA). This invention provides for monitoring server presence in conjunction with a messaging notification system. Thus, even if a user is not at a computer running a mobile messaging service, the mobile messaging system can check with a main server (or servers) to determine when the user last accessed a particular service (e.g., when the user last read an email message) and factor such access into performing the message routing service. Such technique enhances these systems (e.g., provides for more meaningful rendering of services, mitigates redundancy/duplicity . . . ).

The invention also allows for messaging services to be installed on a single client machine but have an effect as if it were installed on a centralized server or servers. Also, various methods can be implemented with legacy email servers. This can be achieved by giving a client-side application that senses local context and/or routes messages based on local context and presence, the ability to make calls to legacy email servers about the time that messages were last accessed, or an email store on the server was interacted with in any way from any client.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 3 is a diagram illustrating a presence schema in accordance with an aspect of the present invention.

FIG. 4 is a user interface illustrating message delivery options in accordance with an aspect of the present invention.

FIG. 5 is a user interface illustrating message routing options in accordance with an aspect of the present invention.

DETAILED DESCRIPTION OF THE INVENTION

Figure 1:
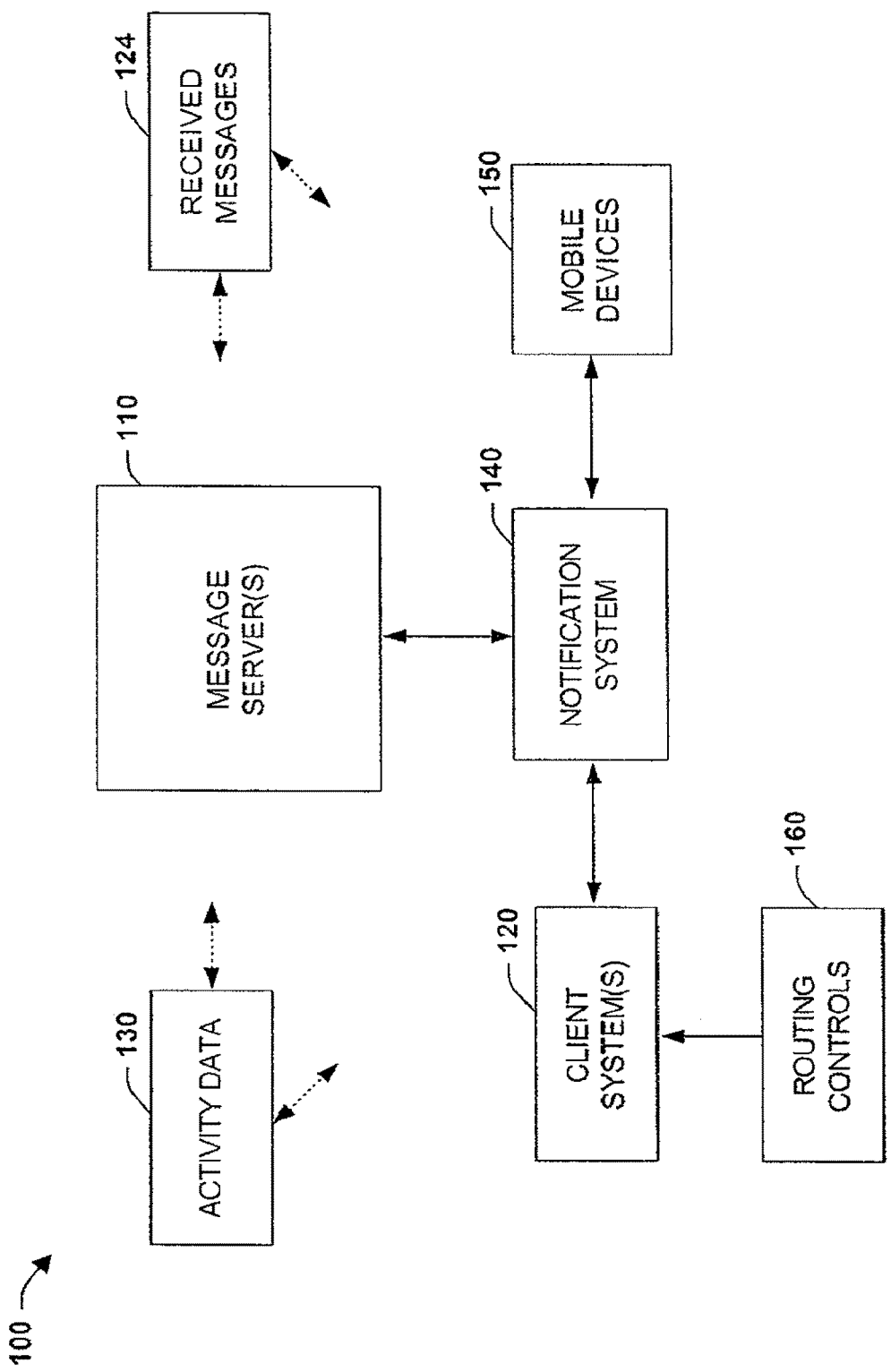
FIG. 1 is a schematic block diagram illustrating message routing in accordance with an aspect of the present invention.

The present invention relates to a system and method to facilitate efficient and automated routing of messages. A messaging system such as priorities system or notification system, for example, operates in conjunction with various components that are distributed over multiple machines. An activity component aggregates user presence data from at least one client application and at least one server application, wherein the presence data can be collected for a plurality of users. A routing component operating one or more systems employs the aggregated presence data to deliver one or more messages to at least one of the client application, the server application, and a mobile device, for example.

In one aspect, the routing component is utilized by at least one of the notification system, the client application, and/or the server application to facilitate delivery of the messages. Also, the routing component can include one or more rules for delivering messages between systems (e.g., before routing messages to user's mobile device or other device, check activity data describing user's presence at other devices).

Various combinations of presence detection are possible including multiple sharing arrangements, parallel arrangements, serial arrangements, and other arrangements to facilitate aggregating presence data between systems in order that users can more efficiently process received messages in a timely manner.

As used in this application, the terms "component," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, content, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 illustrates message routing in accordance with an aspect of the present invention. In this aspect, one or more message servers 110 and client systems 120 receive and/or process electronic messages 124 such as email, voice mail, instant messages, and so forth. While a user processes the messages 124, activity data 130 is monitored, recorded or cached to identify prospective locations of the user with respect to any of the components illustrated in the system 100. A notification system 140, may be included for delivering messages between the client system 120, the server system 110, and/or one or more mobile devices 150 such as a cell phone, pager, PDA, and so forth. The activity data 130 is employed by the various components of the system 100 to facilitate routing of messages to the user. One or more routing controls 160 are provided to enable users to direct or control message flow based upon the activity data 130 which generally describes a user's presence or access to a particular device or system. User interface displays and controls are also provided to enable setting/adjusting of the routing controls 160 which are described in more detail below.

In one aspect of the present invention, a routing solution provides a client-side application resident on the client system 120 an ability to keep track of the last activity on the message server 110. For example, the message server 110 or client system 120 can continue to check for "Inbox presence" or, more generally, "Messaging presence," or "Email server presence," in its decisions about when to initiate mobile alerting via the notification system 140. As one specific example, the system 100 can check when the last email message in a user's inbox on the message server 100 proceeds from unread to read, or a new message came into the sent email folder, as a sign of "Messaging presence." Users can specify via the routing controls 160 that mobile messaging should not occur until they have not been either present at the client 120 or at the server 110 for some time that is passed or that will pass. This allows a single client to make effective mobile alerting decisions.

In another aspect, standard protocols and methods developed for communication between email clients and email servers can be employed (e.g., Microsoft Exchange server communicating to Microsoft Outlook via MAPI (Mail API), etc.) for user presence, availability tracking across multiple clients. This information can be applied in multiple ways, where one focus is on the use of the information by local software modules that consider local context at the client in decisions of various kinds, to give them immediate access to the context across all clients (e.g., for the identification of time since last email interaction for controlling the routing of email to a mobile device).

Thus, email server information that is typically available for standard operations with an email client can be harnessed to derive information about user activity across multiple clients.

Activity information derived from multiple clients can be exploited in a plurality of different applications. This includes systems and methods that can be implemented in an opportunistic way, using existing functionality of existing email servers that talk to clients (e.g., Microsoft Exchange talking to Microsoft Outlook), and that can be made also to communicate with other client-side applications that route messages or track user's context, etc. These systems and methods can be implemented with legacy email servers with the current infrastructure and calls they allow email clients to make as part of their "main business" of supplying email and email-store status to client email readers. That is, standard machinery that already exists for checking for unread messages, new messages, etc. can be employed to draw conclusions about a user's presence elsewhere, on other clients.

In one example, the use of standard communication protocols and methods developed for email servers to interact with local email clients can be harnessed in new ways to track a user's access of email from other clients in a message routing system.

More generally, beyond use in the control of routing (e.g., the use of standard communication protocols and methods developed for email servers to interact with local email clients), standard protocols can be harnessed for tracking a user's communication activity and presence at other clients in a message routing system. Such activity and presence information includes likely past, present, and future presence and availability, attentional status, location, and so forth based upon making standard calls to an email server and then making logical or inferential decisions regarding such activities.

It is noted that the activity data 130 and/or routing controls 160 can be maintained and/or operated by various components in the system 100. Thus, the activity data 130 could be maintained by the message server 110 in one example, wherein the client system 120 contacts the message server to determine user presence before routing a received message 124 to the mobile devices 150. In another case, the client system 120 (e.g., mobile computer) could maintain the activity data 130, notify the messaging server 110 of this activity, wherein received messages 124 are delivered from the server to the client in lieu of sending the received messages to the mobile devices 150. As will be described in more detail below, in addition to the notification system 150, the present invention can employ a priorities system for prioritizing messages as well as substantially any application that processes or routes the messages 124. Such systems can then employ the activity data 130 and the routing controls 160 when determining where to deliver the messages 124.

Figure 2:
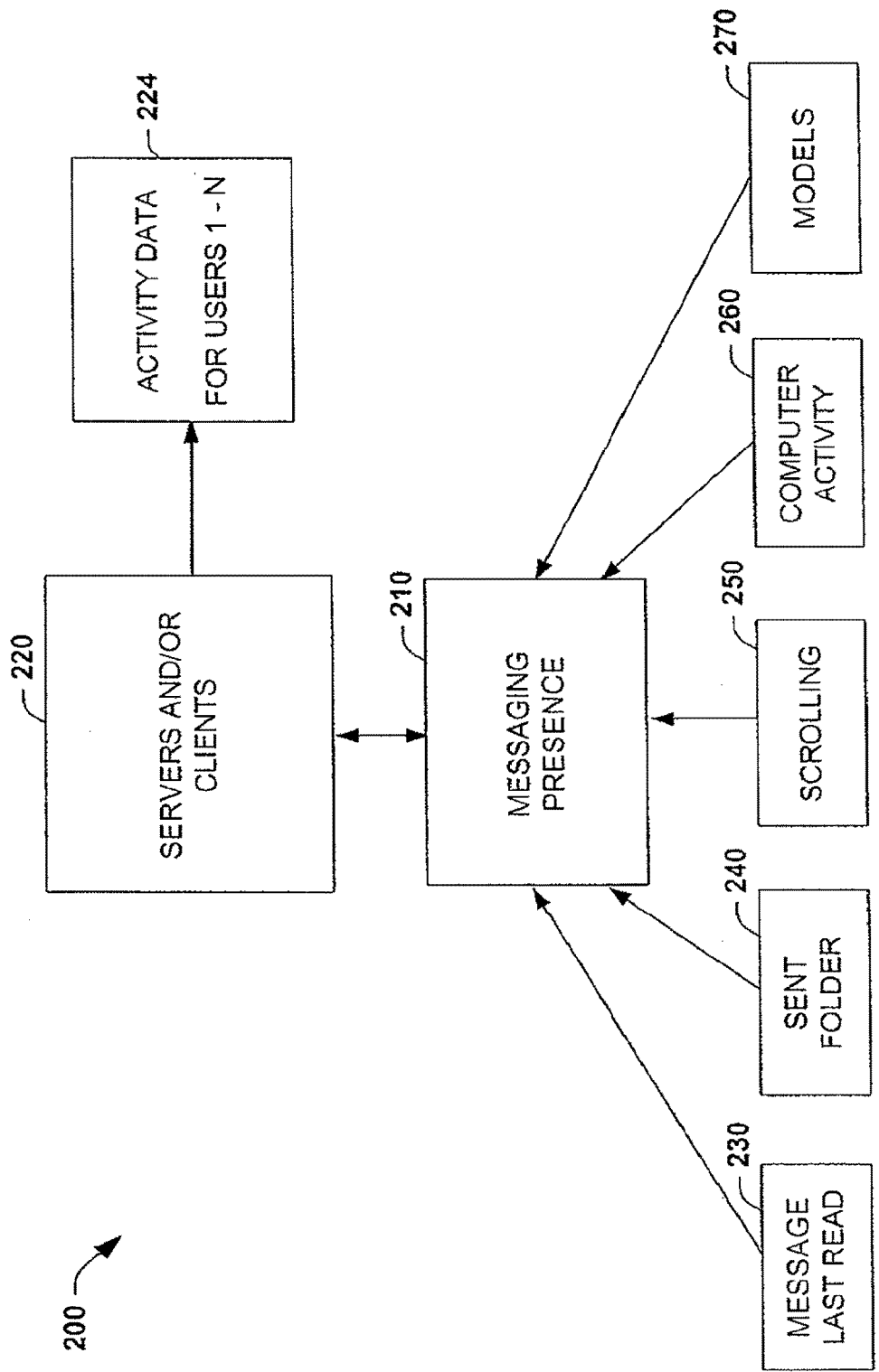
FIG. 2 is a diagram illustrating presence aggregation in accordance with an aspect of the present invention.

Referring now to FIG. 2, a system 200 is illustrates message presence determinations in accordance with an aspect of the present invention. In this aspect, messaging presence information 210 is accumulated from various sources by a client and/or server 220 and maintained as activity data 224 for one or more users (e.g., maintained in a database or cache). The messaging presence information 210 can be derived logically from direct sources and/or can be inferred from evidence of a respective user's presence. In a direct case, presence information 210 can be determined by examining where an email was last read from at 230 (e.g., was email server accessed from desktop application or mobile client application). At 240, a sent folder can be examined to see where the user last generated a message from (e.g., examine sent folder to determine if recent message was directed from client machine).

At 240 and 250, user activities can be monitored to determine presence such as monitoring the user scroll through their inbox of messages at 250 to determine location or monitoring computer activity such as mouse and keyboard activity at 260. When the presence information 210 has been determined, and based upon the routing controls described above, a respective message, notification, priorities, or routing system can direct incoming messages to the user based upon selected controls. In this, manner, when operating a client system for example that is away from a desktop application, the incoming messages can be routed to the client application rather than directing the message to a mobile device (or other alternate communication route) if so desired by the user.

In a more indirect case of determining a user's presence, one or more models 260 (e.g., inference models, probability models, statistical models) may be provided that attempt to predict when and/or where the user may most desire to receive messages including approximating times when the user is likely to be communicating at a respective device or application.

For example, past evidence of the user's comings and goings can be logged over time that relate to the presence and/or other states of the user (e.g., availability to communicate now via one or more forms of channels of communication, goals, attention/focus), wherein a probability model may be constructed to predict the amount of time it may take for the user's likely return expected arrival or current availability based upon recent and/or current evidence that the user has been present/away from a location typically associated with different types of communication channels and availabilities, or more directly reason in a non-location-specific manner relating to the time until a user will likely be available for communication with one or more channels or devices (e.g., e-mail, telephone, pager, desk-top computer). Other predictions may include notices that relate to the user's continued availability given an indication of the user's current availability, for example. In this manner, message senders or systems are provided with useful presence information 210 regarding the probability that a message will likely be received at a given location, in a given period of time by a message recipient. Current contextual information relating to the message recipient, such as time of day and calendaring information, along with a plurality of other user contextual inputs may also be considered when determining user availability time periods for routing respective messages.

The probability model described above can be utilized to drive a plurality of alternative aspects of the present invention. For example, an e-mail system is provided wherein automated replies are generated and transmitted that indicates the user's expected return or current availability. As an example, this may include indicating the amount of time that will pass until the user is expected to return and/or to see a message along with the probability. More generally, a probability distribution may be shared about the likelihood that a user will return and/or see a message at different times. This may include generating one or more messages regarding the user's return with an updated confidence that the user will actually return and/or review a message in the expected timeframe. Furthermore, this can include updating a shared resource, such as a publicly shared calendar, with such time estimates, including the use of special notations or colors to indicate inferred times away, expected current availability, and/or likelihood the user will be employing different forms of communications devices in the near future. Rich predictions can also include the times until user's will likely have access to different kinds of devices or communication channels.

The present invention can also employ the presence information 210 regarding the user's likelihood of return or current availability in other systems and processes. This may include voice mail systems, calendaring systems, scheduling systems, automated maintenance systems, and user tracking systems in order to provide useful information feedback to message senders and/or systems regarding the likelihood of establishing contact and making informed decisions based upon the user's expected availability.

Turning to FIG. 3, a presence schema 300 is illustrated in accordance with an aspect of the present invention. The schema 300 may be employed to store/communicate user presence information on/between one or more systems such as servers 304 and clients 308. The presence schema 300 includes one or more XML elements 310 through 350 (defined by starting and ending tags with (</> symbols), arranged in substantially any order) that relate to one or more presence items and provides information to facilitate delivery of automated messages in accordance with the present invention. Although not shown, the XML elements and associated tags can also include attribute information if desired, wherein an attribute is a name-value pair associated with an element start tag (e.g., <user name="user 1-administrator">).

At 310, a user name may be provided to identify rules that should be applied when routing notifications. This field can be optionally provided and may be useful for machines that support multiple users. At 320, time information may be provided. This field indicates the last recorded time a user has performed an activity such as accessed an inbox or sent a message. At 330, device data is provided in the schema. This field can be useful when the user has multiple machines that apply routing policies in accordance with the present invention. For example, a user may employ two different client machines for accessing a remote Exchange email server. When using one machine, one set of rules may apply and using a subsequent machine a subsequent set of rules may apply (e.g., if I am on my mobile laptop, use routing policy to direct emails to laptop, if I am on my PDA, route all emails to desktop server and page me when message delivered). At 340, the user's last detected activity may be recorded (e.g., sent email from client machine). At 350, applicable policies or rules that may apply for a respective system can optionally be communicated between systems.

Referring now to FIG. 4, a system 400 illustrates routing options in a message prioritization and routing system in accordance with an aspect of the present invention. At 410, a selection option is provided for a message prioritization and routing system that defers messages while users are busy, unless a received message is above a predetermined urgency threshold. In this example, a user has set an urgency threshold of 90. Thus, unless a message is considered or scored more urgent than this predetermined value, messages will be deferred during the busy time. However, the user may still want deferred messages sent to their client applications rather than merely being routed to their desktop application or to a mobile device. In order to deal with this situation, FIG. 5, below, describes a routing control to direct respective messages to the client application, FIG. 5 illustrates a routing control in accordance with an aspect of the present invention. At 510, a selection option is provided to enable users to make a selection indicating that the user's presence on other clients should also be considered by systems that route messages to the user. Thus, by selecting this option 510, routing systems such as a message prioritization and alerting system will determine if the user is currently employing a client system, for example, before routing an incoming message to a mobile device if it determines the user is away from their desktop or other type application that normally receives messages such as email for example.

Figure 6:
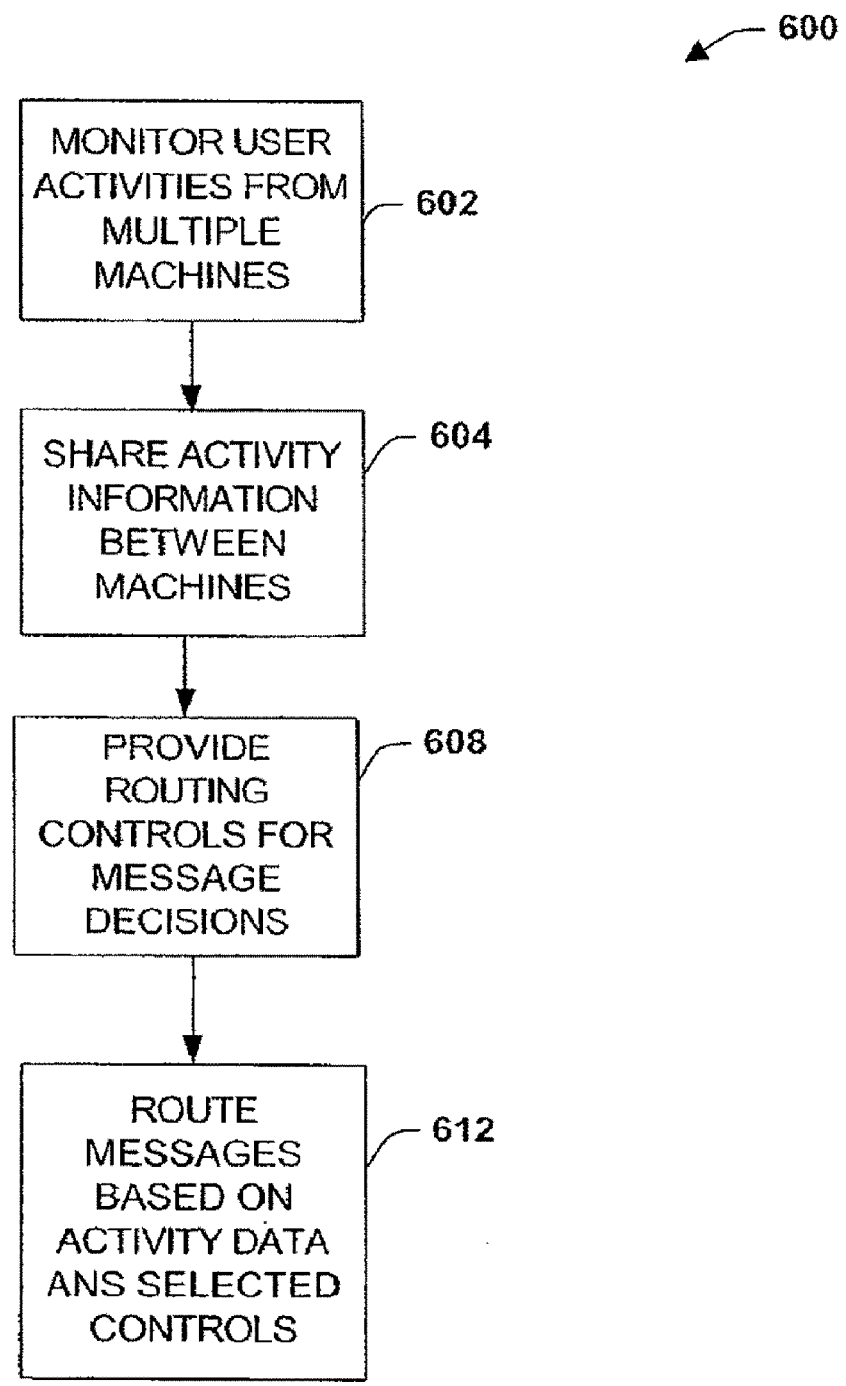
FIG. 6 is a flow diagram illustrating message routing in accordance with an aspect of the present invention.

FIG. 6 illustrates a methodology for routing messages in accordance the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 602, user activities are monitored from one or more machines to determine a user's presence or location. As noted above, this can include checking whether the user is currently reading their mail at a remote location, where they have sent mail from, and other activities such as monitoring a keyboard or mouse, or deriving information from evidence of the user's current/past presence. At 604, user presence activity is shared between one or more systems. This can include polling for presence information from one machine to another and/or can include transmitting such information between machines when presence conditions change. At 608, one or more routing controls are provided to enable users to inform a routing system to consider their client or remote application conditions before diverting messages to a mobile device, for example.

Figure 7:
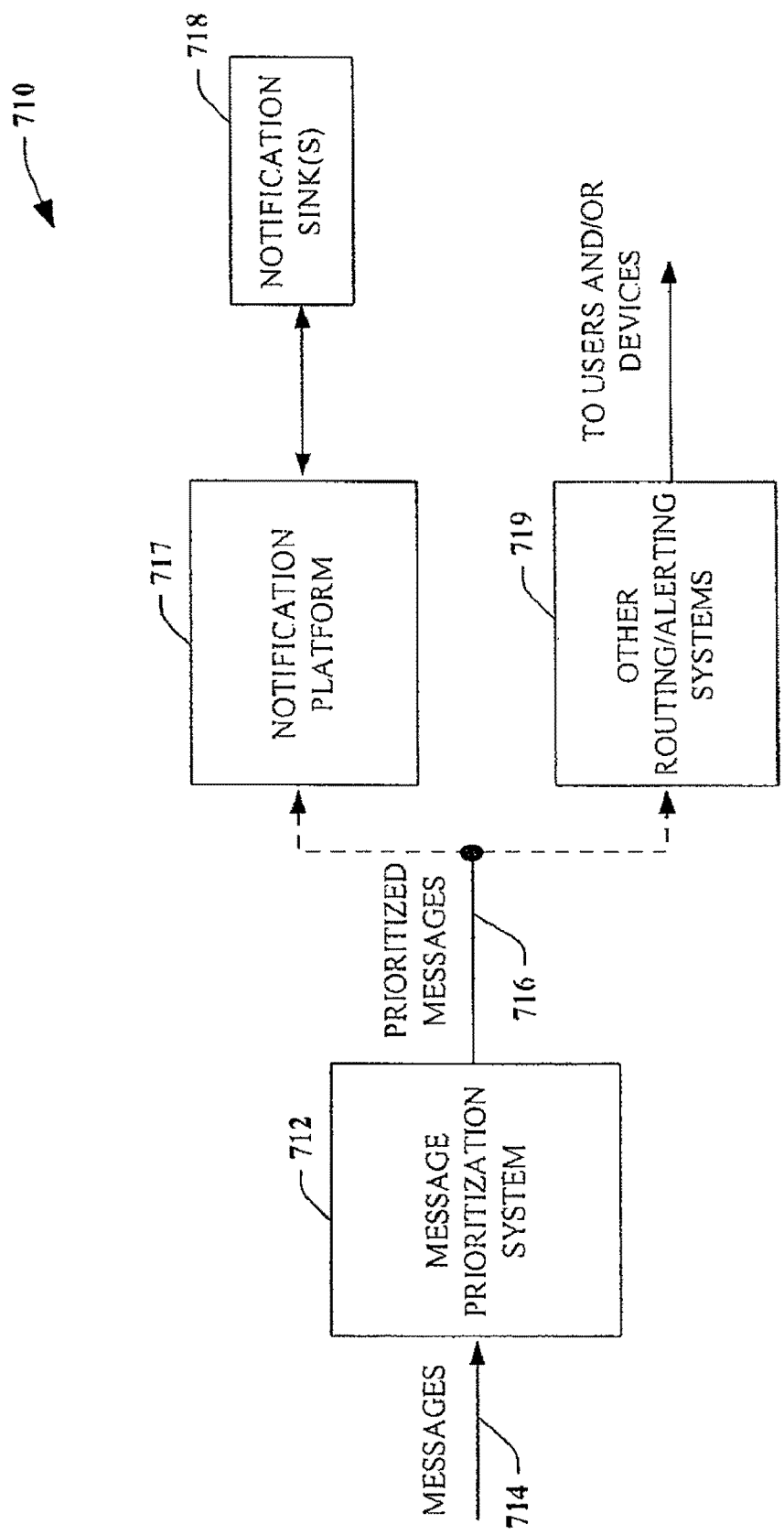
FIG. 7 is a schematic diagram illustrating a priorities system in accordance with an aspect of the present invention.

As noted above, this situation may occur when users of a message prioritization and routing system configure rules to route urgent messages to their mobile devices when they are away from their desktop applications. If the user is employing a subsequent application to access their email for example, then incoming emails or other type messages should therefore be routed to the client system in lieu of routing to the mobile device, if the user in fact selects this type routing control. At 612, messages are automatically routed in accordance with the user's selected controls from 608. Referring to FIG. 7, a system 710 illustrates a priorities system 712 and notification architecture in accordance with an aspect of the present invention. The message prioritization and routing system 712 receives one or more messages or notifications 714, generates a priority or measure of importance (e.g., probability value that the message is of a high or low importance) for the associated message, and provides the one or more messages with an associated priority value at an output 716. As will be described in more detail below, classifiers can be constructed and trained to automatically assign measures of priorities to the messages 714. For example, the output 716 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 717 can be employed in conjunction with the priorities system 712 to direct prioritized messages to one or more notification sinks accessible to users. As will be described in more detail below, the notification platform 717 can be adapted to receive the prioritized messages 716 and make decisions regarding when, where, and how to notify the user, for example. As an example, the notification platform 717 can determine a communications modality (e.g., current notification sink 718 of the user such as a cell phone, or Personal Digital Assistant (PDA)) and likely location and/or likely focus of attention of the user. If a high importance e-mail were received, for example, the notification platform 717 can determine the users location/focus and direct/reformat the message to the notification sink 718 associated with the user. If a lower priority message 716 were received, the notification platform 717 can be configured to leave the e-mail in the user's in-box for later review as desired, for example. As will be described in more detail below, other routing and/or alerting systems 719 may be utilized to direct prioritized messages 716 to users and/or other systems.

Figure 8:
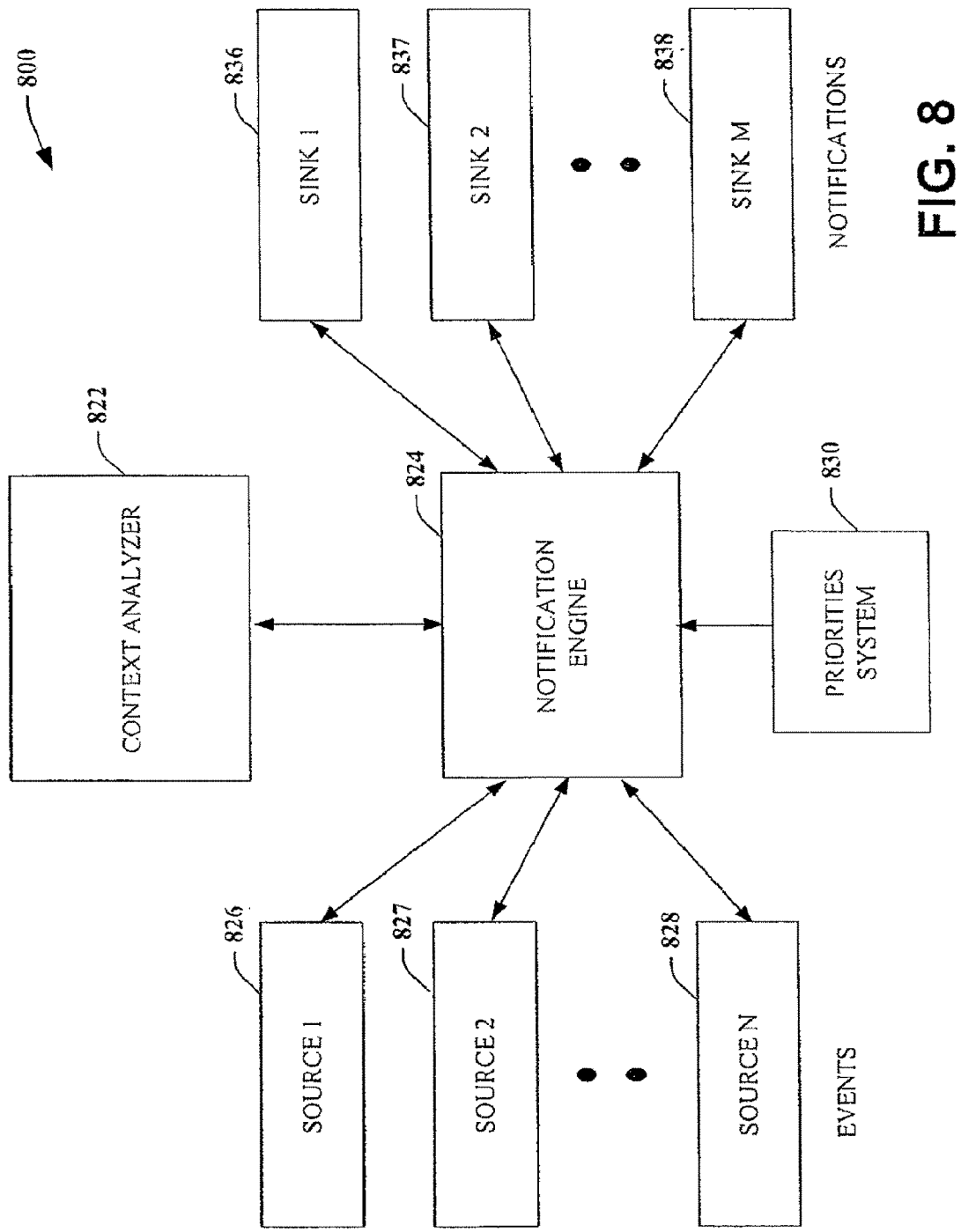
FIG. 8 is a schematic block diagram illustrating systematic cooperation between a notification engine and a context analyzer according to an aspect of the present invention.

Turning now to FIG. 8, a system 800 illustrates how a notification engine and context analyzer function together according to an aspect of the present invention. The system 800 includes a context analyzer 822, a notification engine 824, one or more notification sources 1 through N, 826, 827, 828, a priorities system 830, which can operate as a notification source, and one or more notification sinks, 1 through M, 836, 837, 838, wherein N an M are integers, respectively. The sources are also referred to as event publishers, while the sinks are also referred to as event subscribers. There can be any number of sinks and sources. In general, the notification engine 824 conveys notifications, which are also referred to as events or alerts, from the sources 826-828 to the sinks 836-838, based in part on parametric information stored in and/or accessed by the context analyzer 822.

The context analyzer 822 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 824, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 822, according to one aspect of the present invention is inclusive of contextual information determined by the analyzer. The contextual information is determined by the analyzer 822 by discerning the user's location and attentional status based on one or more contextual information sources (not shown), as is described in more detail in a later section of the description. The context analyzer 822, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 826-828, 830 generate notifications intended for the user and/or other entity. For example, the sources 826-828 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the message prioritization and routing system 830 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 826-828 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;
computer systems (e.g., that may alert the user with messages that information about alerts about system activity or problems);
Internet-related services, appointment information, scheduling queries;
changes in documents or numbers of certain kinds of documents in one or more shared folders;
availability of new documents in response to standing or persistent queries for information; and/or,
information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 836-838 are able to provide notifications to the user. For example, such notification sinks 836-838 can include computers, such as desktop and/or laptop computers, handheld computers, cell phones, landline phones, pagers, automotive-based computers, as well as other systems/applications as can be appreciated. It is noted that some of the sinks 836-838 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many ceil phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 824 accesses the information stored and/or determined by the context analyzer, and determines which of the notifications received from the sources 826-828 to convey to which of the sinks 836-838. Furthermore, the notification engine 824 can determine how the notification is to be conveyed, depending on which of the sinks 836-838 has been selected to send the information to. For example, it may be determined that notifications should be summarized before being provided to a selected sinks 836-838.

The invention is not limited to how the engine 824 makes its decisions as to which of the notifications to convey to which of the notification sinks, and in what manner the notifications are conveyed. In accordance with one aspect, a decision-theoretic analysis can be utilized. For example, the notification engine 824 can be adapted to infer important uncertainties about variables including a user's location, attention, device availability, and amount of time until the user will access the information if there were no alert. The notification engine 824 can then make notification decisions about whether to alert a user to a notification, and if so, the nature of the summarization and the suitable device or devices to employ for relaying the notification. In general, the notification engine 824 determines the net expected value of a notification. In doing so, it can consider the following:

the fidelity and transmission reliability of each available notification sink;
the attentional cost of disturbing the user;
the novelty of the information to the user;

the time until the user will review the information on his or her own;

the potentially context-sensitive value of the information; and/or, the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 824 can make decisions as to one or more of the following:

what the user is currently attending to and doing (based on, for example, contextual information, including head pose and/or gaze as tracked by gaze tracking machinery);

where the user currently is;

how important the information is;

what is the cost of deferring the notification;

how distracting would a notification be;

what is the likelihood of getting through to the user; and, what is the fidelity loss associated with the use of a specific mode of a given notification sink.

Therefore, the notification engine 824 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

Furthermore, the notification engine 824 can access information stored in a user profile by the context analyzer 822 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 824 determines how and whether to notify the user.

According to one aspect of the present invention, the notification platform architecture 800 can be configured as a layer that resides over an eventing or messaging infrastructure. However, the invention is not limited to any particular eventing infrastructure Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks such as endpoint devices receive notifications, alerts and events, for example. The present invention is not so limited, however.

Figure 9:
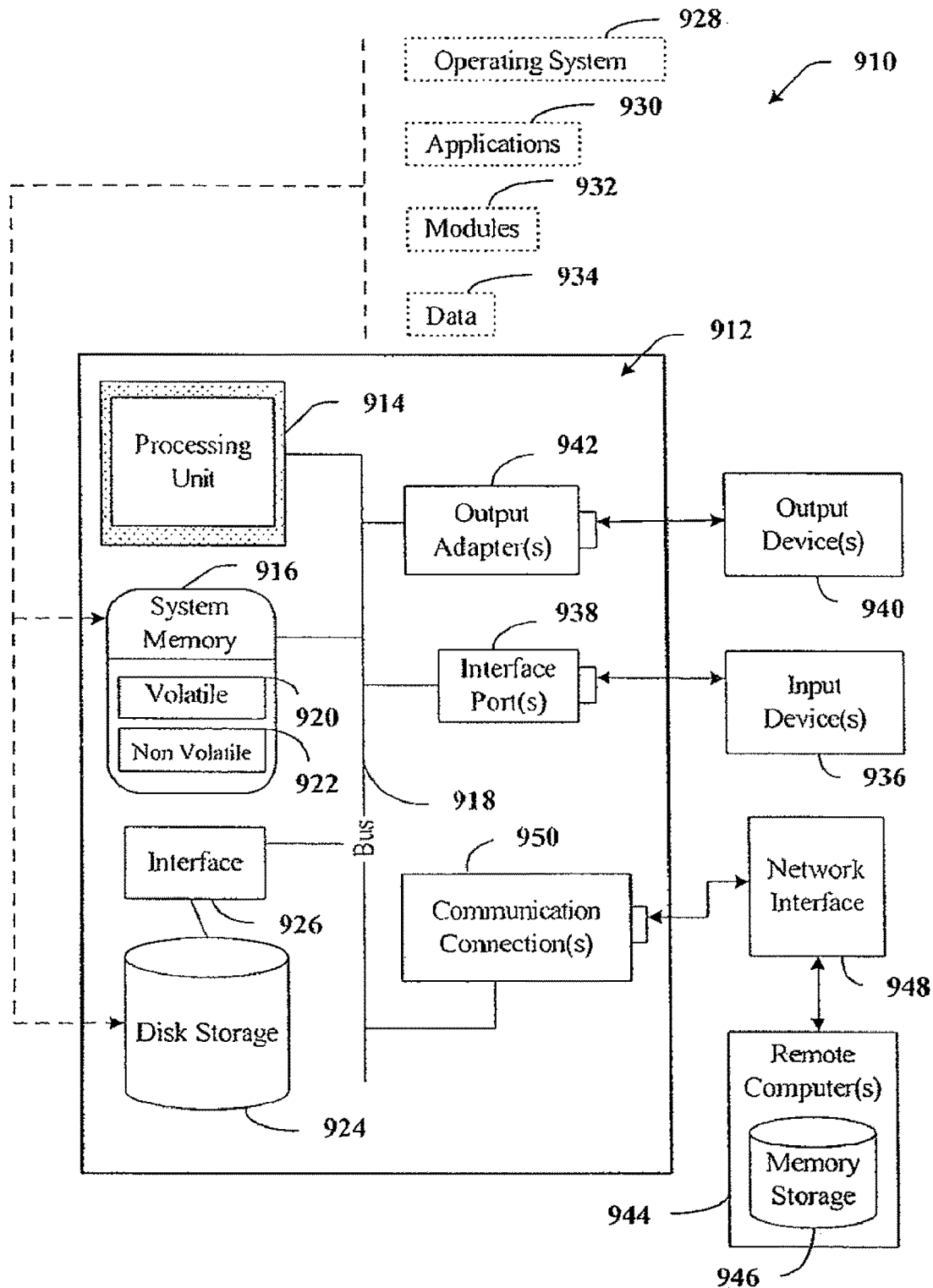
FIG. 9 is a schematic block diagram illustrating a suitable operating environment in accordance with an aspect of the present invention.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
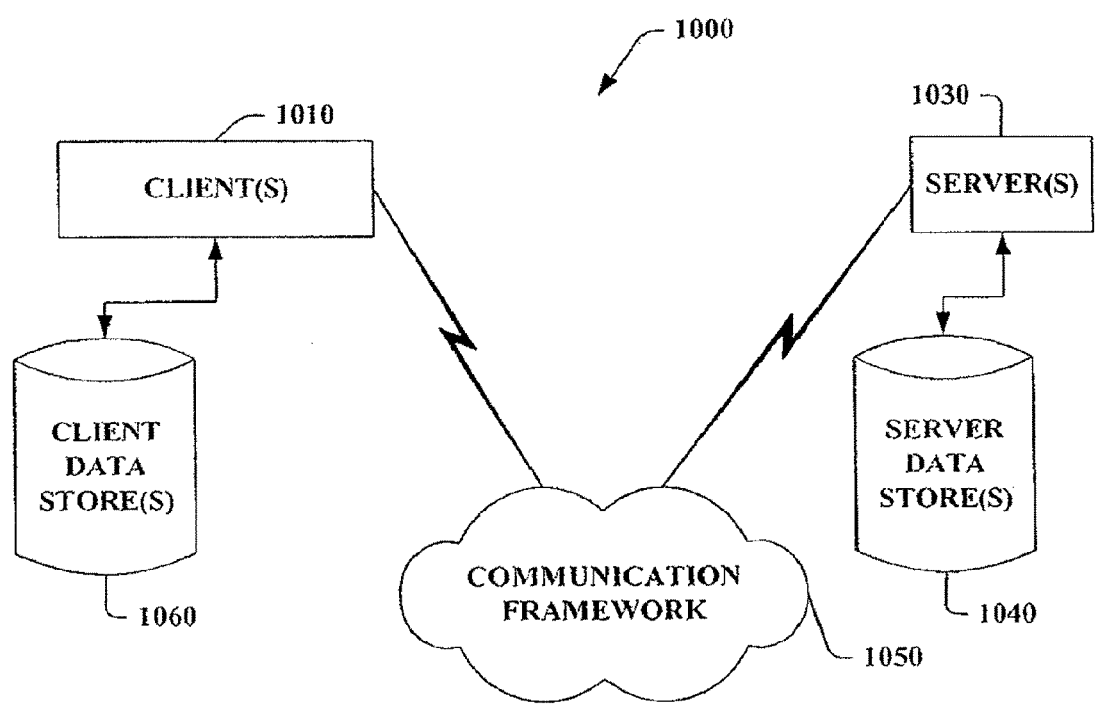
FIG. 10 is a schematic block diagram of a sample-computing environment with which the present invention can interact.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A messaging system, comprising:
  at least one computer processor for executing the following components:
    an activity component that aggregates presence data for at least one client application and at least one server application, the activity component monitors user activities from one or more machines to determine presence data, and wherein the presence data identifies prospective locations of a user with respect to a message routing system, the presence data is stored in computer storage medium and communicated between the at least one client application and the at least one server application;
    a routing component that employs the aggregated presence data to deliver one or more messages to at least one of the client application, the server application, and a mobile device, the routing component includes one or more rules for delivering messages between systems, the rules being based on a prediction of when and where the user desires to receive messages, the prediction being based on past evidence of a user's comings and going that indicate a presence of the user, wherein the routing component is employed by at least one of a notification system, a priorities system, the client application, and the server application to facilitate delivery of the messages; and
    a context analyzer that analyzes information regarding variables and parameters of a user that influence delivery of the messages, the parameters being functions of observations made autonomously, and the parameters including contextual information, comprising one or more of:
      historical information on the user's locations;
      historical information on the user's attentional focus;
      historical information on the user's activities per time of day and the day of the week;
      information indicating devices that users tend to have access to in different locations; and
      notification parameters indicating how the user desires to be notified at a given time.

2. The system of claim 1, wherein the one or more messages include one or more of: an email, a voice mail, and an instant message.

3. The system of claim 1, further comprising a graphical user interface display and controls to enable adjusting of the routing component.

4. The system of claim 1, wherein the activity component monitors or records one or more of: a message last sent, a sent folder and a computer activity, to determine a user's messaging presence.

5. The system of claim 4, wherein the computer activity includes one or more of: a scrolling action, a mouse activity, and a keyboard activity.

6. The system of claim 1, wherein the activity component comprises a model, the model predicting an amount of time it may take for the user's likely return, expected arrival or current availability based upon recent and/or current evidence that the user has been present or away from a location associated with different types of communication channels and availabilities.

7. The system of claim 1, wherein the activity component comprises a model, and the model predicts the user's continued availability given an indication of the user's current availability.

8. A computer storage medium having computer executable instructions stored thereon for implementing at least one of the activity component and the routing component of claim 1.

9. The system of claim 1, further comprising means for routing the messages to the server when the user is at a desktop system.

10. The system of claim 9, further comprising means for routing the messages to a mobile device.

11. A computer-implemented method that facilitates message routing, comprising:
  automatically determining a user's presence information with respect to a computer, via monitoring user activities from one or more machines, wherein monitoring the user activities comprises monitoring user inputs to the computer and wherein the presence information identifies locations of a user with respect to a message routing system, the presence information is recorded in a computer storage media and communicated between at least one client application and at least one server application;
  automatically directing the messages to at least one computer based upon the user's determined presence information and one or more rules for delivering messages;
  analyzing information regarding variables and parameters of a user that influence delivery of the messages, the parameters being functions of observations made autonomously via one or more sensors, and the parameters including contextual information, comprising:
    one or more of: a user's typical locations and attentional focus and activities per time of day and the day of the week;
    devices users tend to have access to in different locations, and
    notification parameters indicating how the user desires to be notified at a given time, storing the parameters as a user profile to be edited by the user; and
  providing a cost of disruption associated with having the messages delivered by different modes in different settings.

12. The method of claim 11, further comprising at one or more of:
  checking whether the user is currently reading their mail at a remote location,
  checking from where the user has sent mail,
  monitoring a keyboard or mouse, and
  deriving information from evidence of the user's current or past presence.

13. The method of claim 11, further comprising sharing the user's presence information between two or more systems.

14. The method of claim 13, further comprising polling for presence information from one machine to another.

15. The method of claim 13, further comprising transmitting presence information between machines when presence conditions change.

16. A method to facilitate communication and collaboration, comprising:
  with at least one processor:
    recording information relating to preferences of a user for delivering messages to devices of a plurality of devices, the plurality of devices comprising a client device and a mobile device;
    collecting information indicating user access to a message system from devices of the plurality of devices; and
    determining whether the user is present to access a message at the client device, and when the user is not present to access the message at the client device, selectively routing the message to the mobile device based on the preferences of the user and the collected information indicating user access to the message system.

17. The method of claim 16, wherein selectively routing further comprises:
  using a time since a last interaction between the client device and a server to guide decisions about if, when, and how to route messages so as to limit a mobile relay of information a user has already observed; and
  providing information to colleagues about the user's current or past inbox presence, and forecasting the time until the user will have access to a device or communication channel.

18. The method of claim 16, wherein collecting information indicating user access to the message system comprises utilizing standard protocols and methods developed for communication between email clients and email servers.

19. The method of claim 18, wherein the collected information is applied by local software modules that consider local context at a client in decisions to give access to the local context across other clients.

20. The method of claim 19, wherein the collected information is employed for an identification of time since a last email interaction in order to control routing of email to a mobile device.

* * * * *

UNITED STATES PATENT AND TRADEMARK OFFICE
CERTIFICATE OF CORRECTION

PATENT NO. : 8,019,834 B2  
APPLICATION NO. : 12/476195  
DATED : September 13, 2011  
INVENTOR(S) : Eric J. Horvitz et al.

Page 1 of 1

It is certified that error appears in the above-identified patent and that said Letters Patent is hereby corrected as shown below:

In column 17, line 44, in Claim 12, after "comprising" delete "at".

Signed and Sealed this  
Twenty-ninth Day of November, 2011

David J. Kappos  
*Director of the United States Patent and Trademark Office*